Nov. 4, 1958   A. N. McGURK   2,858,709
BELL CRANK ASSEMBLIES
Filed Aug. 20, 1954

INVENTOR.
ALFRED N. McGURK
BY Bertha L. McGregor
ATTORNEY

United States Patent Office 2,858,709
Patented Nov. 4, 1958

2,858,709

BELL CRANK ASSEMBLIES

Alfred N. McGurk, Denver, Colo.

Application August 20, 1954, Serial No. 451,116

1 Claim. (Cl. 74—519)

This invention relates to bell crank assemblies, and particularly to lubricated bell crank assemblies provided with antifriction means, for connecting throttle rods for operating carburetors or fuel pumps of internal combustion engines of trucks, buses and industrial machines.

The main object of the invention is to produce a self-contained, compact, lubricated bell crank assembly which is efficient for its intended purposes, which can be quickly and easily mounted on a fixed part of an engine, and be maintained at low cost.

Another object of the invention is to construct and form the bell crank assembly so that it can move pivotally on its shaft, as required, without interference by parts of the engine on which it is mounted.

Bell crank levers have been used in many environments, but they have not been provided with self-contained lubricating means, nor with antifriction bearings, and consequently have been subject to frictional wear of the bell crank and its shaft. In such prior art constructions it has been necessary to employ hubs of substantial axial thickness in order to provide relatively large bearing surfaces between the hub and shaft to distribute wear on the parts. By the structural changes I have made, the bell crank of my invention is relatively light, flat and thin, both in its arm and hub portions, but stronger than those heretofore used for similar purposes. Because of its construction and form it can be spaced from the engine wall as required for free operation, without sacrifice of compactness of the assembly as a whole.

Figure 1:
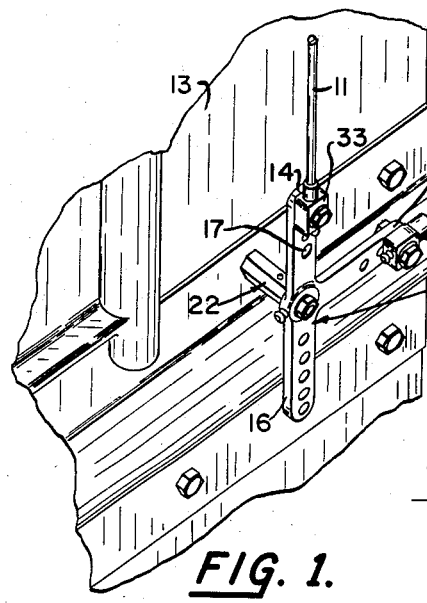
Fig. 1 is a perspective view of a bell crank assembly embodying my invention, mounted on an engine wall, showing parts of the throttle rods leading to an operating lever and to a carburetor or fuel pump (not shown).
Figure 2:
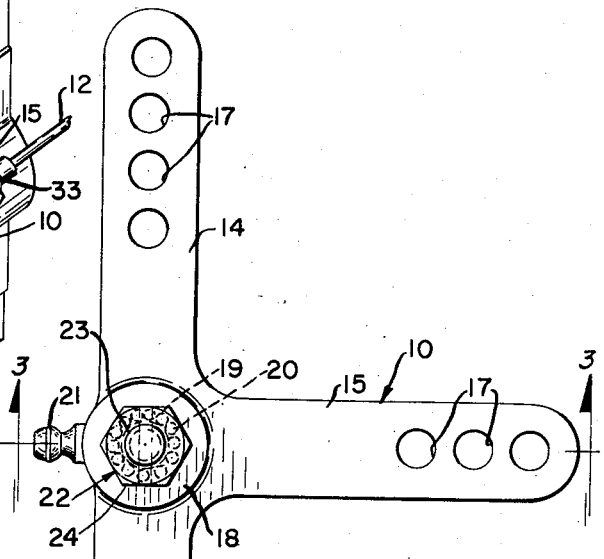
Fig. 2 is an elevational side view of the bell crank assembly.
Figure 3:
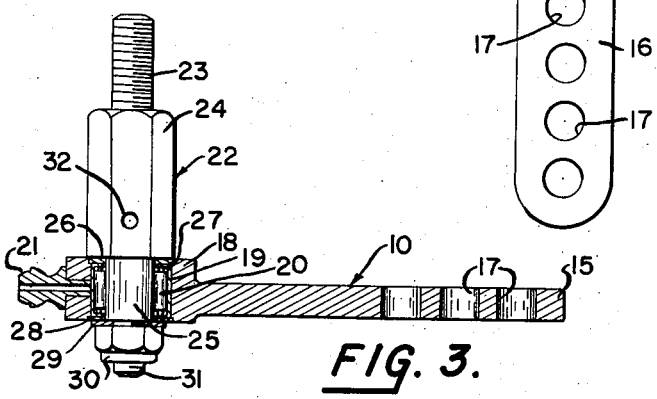
Fig. 3 is a sectional view, partly in elevation, in the plane of the line 3—3 of Fig. 2.
Figure 4:
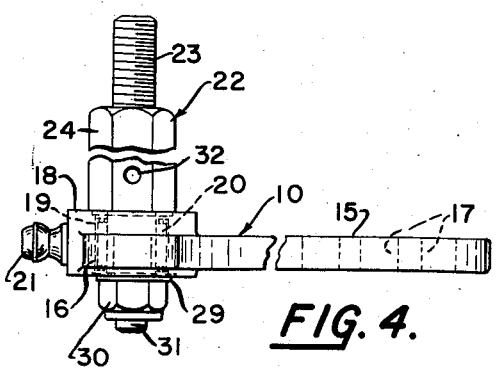
Fig. 4 is a top plan view of the assembly shown in Fig. 2.

In the preferred embodiment of my invention shown in the drawing, the bell crank assembly is indicated as a whole at 10, connected to a throttle rod 11 leading to a carburetor or fuel pump (not shown) and to a throttle rod 12 leading to a foot pedal (not shown). The assembly 10 is mounted on the engine wall 13.

The bell crank assembly comprises three arms, 14, 15 and 16, each provided with apertures 17. The arms are flat and relatively thin. The hub 18 also is flat and relatively thin, though somewhat thicker than the arms. The hub is centrally bored, and surrounding the central opening is a raceway 19 for the reception of roller or needle bearings 20. The raceway 19 consists of a circumferential wall and axially spaced flanges, the raceway being fitted into the central opening of the hub 18 and disposed in said opening with the flanges of the raceway directed radially inwardly. The roller or needle bearings 20 are disposed intermediate the flanges of the raceway in contact with said circumferential wall, with the axes of the rollers parallel to said wall and to the axis of the hub opening. A grease fitting 21 communicates with the raceway 19 at the side of the hub opposite the arm 15.

The bell crank 10 is mounted on a shaft indicated as a whole at 22. It comprises a threaded end portion 23 and a body portion 24 hexagonal in cross section, of greater diameter than the end 23. Said body portion 24 is located between the threaded end 23 and a smooth round hub-bearing portion 25, smaller in diameter than the body 24, forming a shoulder 26 against which the hub 18 bears when the parts are assembled as shown. A plastic washer 27 fits within a countersunk portion of the hub, adjacent one end of the roller bearings 20, between said bearings and the shaft shoulder 26. A similar plastic washer 28 is located in the countersunk portion of the hub adjacent the opposite end of the roller bearings 20, closing the raceway 19, said washers 27 and 29 covering the ends of the flanges of the raceway 19, and the shaft shoulder 26 covering the washer 27 and extending beyond the margins of the countersunk portion of the hub side surface. A lock washer 29 and lock nut 30 on the reduced threaded end 31 of the shaft 22 retain the lubricated antifriction bell crank on the part 25 of the shaft, with the roller bearings in direct contact with said smooth hub bearing portion 25, when the parts are assembled as shown in the drawings.

The bell crank assembly may be installed on the engine 13 by screwing the threaded end 23 into a threaded hole, a number of which usually are provided in engine walls. The hole 32 which extends through the body 24 of the shaft may be used for reception of a rod for turning the shaft for the purpose of mounting the assembly on the engine.

The throttle rods 11 and 12, respectively, are connected to two of the three arms 14, 15 or 16, as required by the particular installation, by means of connectors 33 to which said rods are secured. The connectors 33 include bolts which extend through selected openings 17 in the two arms.

Preferably the bell crank is made of aluminum and the shaft of steel, with the bearing portion 25 ground smooth and case hardened for free frictionless pivotal movement of the bell crank thereon.

Changes may be made in details of construction and form of the parts without departing from the scope of my invention as defined by the appended claim.

I claim:

A bell crank assembly for connecting throttle rods and the like, comprising a flat sided, axially relatively thin hub provided with a central opening extending from one side to the other, countersunk surfaces in the hub sides surrounding said opening, a plurality of relatively thin arms extending radially from the hub between the side surfaces of the hub, a plurality of apertures extending through each arm, a raceway having a circumferential wall and axially spaced flanges fitted into the hub opening between the countersunk surfaces and disposed in said opening with the flanges of the raceway directed inwardly, a plurality of rollers disposed intermediate the flanges in said raceway in contact with said circumferential wall, with the axes of the rollers parallel to said wall and to the axis of the hub opening, a grease fitting mounted on the hub in communication with the raceway, an integrally formed shaft having a body portion, a reduced smooth round hub bearing portion extending axially from the body portion, a flat shoulder surface on the end of the body portion adjacent said reduced portion, a threaded end member extending axially beyond the body portion, and a second threaded end member extending axially beyond the reduced portion of the shaft, said shoulder surface covering one of the countersunk side surfaces of the hub and extending radially beyond the margins thereof in contact with the hub, said smooth round reduced portion being in direct contact with said rollers in the raceway, a lock nut on said second threaded end member, a washer between one countersunk surface of the hub and said shaft shoulder, and a washer between the other countersunk surface of the hub and said lock nut on the second threaded end member of the shaft, said shaft body portion serving to space the hub and arms from the support on which the assembly may be mounted for rotation of said hub on the reduced portion of the shaft.

References Cited in the file of this patent

UNITED STATES PATENTS

| | | |
|---|---|---|
| 1,414,907 | Vogt | May 2, 1922 |
| 1,655,169 | Taub | Jan. 3, 1928 |
| 1,681,014 | Sanford | Aug. 14, 1928 |
| 1,693,832 | Vincent | Dec. 4, 1928 |
| 1,964,061 | Insley et al. | June 26, 1934 |
| 2,369,421 | Warren | Feb. 13, 1945 |
| 2,474,016 | Smith | June 21, 1949 |
| 2,669,981 | Leach | Feb. 23, 1954 |
| 2,764,393 | Geyer | Sept. 25, 1956 |